(12) United States Patent
Tan et al.

(10) Patent No.: US 12,422,883 B2
(45) Date of Patent: Sep. 23, 2025

(54) SYSTEM AND A METHOD FOR ALIGNING A PROGRAMMABLE CLOCK OR STROBE

(71) Applicant: SKYECHIP SDN BHD, Pulau Pinang (MY)

(72) Inventors: Tat Hin Tan, Pulau Pinang (MY); Soon Chieh Lim, Pulau Pinang (MY); Zhen Peng Chok, Pulau Pinang (MY); Chee Hak Teh, Pulau Pinang (MY); Cheau Nih Tan, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 0 days.

(21) Appl. No.: 18/170,599

(22) Filed: Feb. 17, 2023

(65) Prior Publication Data

US 2024/0192721 A1   Jun. 13, 2024

(30) Foreign Application Priority Data

Dec. 14, 2022   (MY) .............................. PI2022007112

(51) Int. Cl.
*G06F 1/08*   (2006.01)
*G06F 1/12*   (2006.01)

(52) U.S. Cl.
CPC . *G06F 1/08* (2013.01); *G06F 1/12* (2013.01)

(58) Field of Classification Search
CPC ..................................... G06F 1/08; G06F 1/12
See application file for complete search history.

(56) References Cited

U.S. PATENT DOCUMENTS

| | | | |
|---|---|---|---|
| 5,857,095 A | 1/1999 | Jeddeloh et al. | |
| 7,071,746 B2* | 7/2006 | Suda | H03K 5/135 327/158 |
| 7,076,013 B2* | 7/2006 | Cho | H03L 7/0814 327/158 |
| 7,197,053 B1* | 3/2007 | Liu | H04J 3/047 375/376 |
| 7,583,102 B1* | 9/2009 | Simmons | H03K 19/17744 326/46 |
| 9,612,611 B1* | 4/2017 | Nakibly | G06F 1/04 |
| 2003/0001612 A1* | 1/2003 | Menezes | G06F 1/08 326/37 |
| 2005/0138444 A1* | 6/2005 | Gaskins | G06F 1/3203 713/300 |
| 2005/0270073 A1* | 12/2005 | Lee | G06F 1/08 327/99 |

(Continued)

*Primary Examiner* — Faisal M Zaman

(57) ABSTRACT

The present invention relates to a system (100 or 200) for aligning a programmable clock or strobe. The system (100 or 200) comprises a first programmable delay unit (1a) for receiving the programmable clock or strobe, characterized by a second programmable delay unit (1b) connected in parallel to the first programmable delay unit (1a) for receiving the programmable clock or strobe, a switch (2) for switching one of the two programmable delay units (1a or 1b) to service the programmable clock or strobe so as to allow the other programmable delay unit (1a or 1b) to adjust the other programmable clock or strobe, and a control logic component (3) for handling the switching of the switch (2), in which the switch (2) swaps in the adjusted programmable clock or strobe to service a downstream clocktree or strobe path after the programmable clock or strobe is adjusted. The present invention also relates to a method for aligning a programmable clock or strobe.

10 Claims, 12 Drawing Sheets

(56) References Cited

U.S. PATENT DOCUMENTS

| | | | |
|---|---|---|---|
| 2015/0106635 A1* | 4/2015 | Kawakami | G06F 1/08 |
| | | | 713/400 |
| 2015/0127877 A1* | 5/2015 | Novellini | H03M 9/00 |
| | | | 710/316 |
| 2017/0250695 A1* | 8/2017 | Lee | H03L 7/091 |
| 2018/0018009 A1* | 1/2018 | Kommrusch | G06F 1/324 |
| 2018/0358970 A1* | 12/2018 | Wang | H03K 19/17796 |
| 2020/0402929 A1* | 12/2020 | Lentz | H03K 19/20 |
| 2021/0064380 A1* | 3/2021 | Mai | H03H 17/06 |
| 2021/0083666 A1* | 3/2021 | Matalon | H03K 5/135 |
| 2022/0019257 A1* | 1/2022 | Chambers | G06F 1/06 |
| 2024/0072772 A1* | 2/2024 | Li | G06F 1/10 |

* cited by examiner

SYSTEM AND A METHOD FOR ALIGNING A PROGRAMMABLE CLOCK OR STROBE

CROSS-REFERENCE TO RELATED APPLICATIONS

This application claims priority to MY Patent Application No. PI2022007112 filed on Dec. 13, 2022, the entire contents of which are hereby incorporated by reference.

TECHNICAL FIELD

This invention relates generally to the field of clock signal and strobe signal management. More particularly, the present invention pertains to a system and a method for aligning a programmable clock or strobe.

BACKGROUND ART

Due to voltage and temperature drifts in a silicon device, two clocks which are initially aligned will become misaligned or a non-continuous strobe signal will be inappropriately placed. In the process of clock phase alignment or updating strobe delay, glitches will arise if the alignment is not performed carefully, thereby causing the downstream logic served by the clock to suffer functional errors. Some advances and improvements have been made in creating and discovering better clock or strobe alignment techniques. Examples of related references are described below, and the supported teachings of each reference are incorporated by reference herein:

U.S. Pat. No. 5,857,095A discloses an apparatus and a method for delaying or skewing a control signal provided to an electronic device such as a memory device with an alignment delay, such that the overall delay associated with the alignment delay and the propagation delay associated with outputting the control signal to the electronic device substantially equals one or more integral cycles of a clock signal. As a result, the control signal received at the electronic device is substantially aligned with the clock signal. This results in synchronizing or realigning the asynchronously-generated control signal back into a synchronous environment. The apparatus and method have unique applicability when used in memory controllers and the like for handling memory accesses with one or more memory devices, in particular with memory devices having enhanced memory transfer modes or higher transfer speeds, where even a small amount of skew between a control signal and a clock signal may significantly degrade performance. A propagation delay, or delay factor, associated with outputting the control signal to the electronic device is computed based upon the process factor for the apparatus, as well as any temperature and/or voltage variations. In addition, the delay factor may be modified dynamically to account for real-time voltage and/or temperature variations.

U.S. Pat. No. 7,071,746B2 discloses a variable delay circuit including plural stages of first variable delay elements coupled in series for sequentially delaying a reference clock signal or a data signal, a second variable delay element coupled in parallel to the plural stages of first variable delay elements for delaying the reference clock signal, a phase comparator for comparing the phase of the reference clock signal delayed by the plural stages of first variable delay elements with the phase of the reference clock signal delayed by the second variable delay element, and a delay amount control unit for controlling the delay amount of each of the plural stages of first variable delay elements based on the comparison result of the phase comparator in order that the phase of the reference clock signal delayed by the plural stages of first variable delay elements is substantially the same as the phase of the reference clock signal delayed by the second variable delay element after predetermined cycles.

U.S. Pat. No. 7,076,013B2 discloses a clock synchronization device which optimizes clock skew without increasing the number of unit delay cells by using an auxiliary delay circuit when a clock signal of ultra-low frequency is inputted and improves operation frequency by using different programmable dividers to operate at different division rates when clock signals of high frequency and low frequency are inputted. Additionally, the optimum clock synchronization device may be embodied by using a replica delay unit corresponding with the package type.

Nevertheless, the references described above and other existing techniques still suffer from a number of problems of which the objectives and features of the present invention attempt to address. For example, the delay of the delay elements of the existing techniques may as well vary or fluctuate following the voltage/temperature variation, thereby resulting in inaccurate delay. Moreover, the existing techniques rely heavily on a clock to initiate the strobe switching or swapping. When they are starved of toggling edges as in the case of the strobe in a long idle state, an update is absent and hence, huge shifts in the delay may incur. Therefore, there still remains a need in the art to provide a system and a method that solve the problem described herein.

SUMMARY OF THE INVENTION

The following presents a simplified summary of the present invention in order to provide a basic understanding of some aspects of the present invention. This summary is not an extensive overview of the present invention. Its sole purpose is to present some concepts of the present invention in a simplified form as a prelude to a more detailed description that is presented later.

It is an objective of the present invention to provide a system and a method that align the phase of a clocktree with the phase of a reference clocktree without causing clock output glitches.

It is also an objective of the present invention to provide a system and a method that are capable of updating a programmable delay line for non-continuous strobe signals without causing output strobe glitches.

It is further an objective of the present invention to provide a system and a method that are capable of facilitating the strobe swapping or delay update at any time without requiring the presence of a toggling clock or strobe.

Accordingly, these objectives may be achieved by following the teachings of the present invention. The present invention relates to a system for aligning a programmable clock or strobe. The system comprises a first programmable delay unit for receiving the programmable clock or strobe, characterized by a second programmable delay unit connected in parallel to the first programmable delay unit for receiving the programmable clock or strobe, a switch for switching one of the two programmable delay units to service the programmable clock or strobe so as to allow the other programmable delay unit to adjust the other programmable clock or strobe, and a control logic component for handling the switching of the switch, in which the switch swaps in the adjusted programmable clock or strobe to service a downstream clocktree or strobe path after the programmable clock or strobe is adjusted.

The present invention also relates to a method for aligning a programmable clock or strobe. The method comprises the steps of receiving the programmable clock or strobe by a first programmable delay unit, receiving the programmable clock or strobe by a second programmable delay unit connected in parallel to the first programmable delay unit, switching one of the two programmable delay units by a switch to service the programmable clock or strobe so as to allow the other programmable delay unit to adjust the other programmable clock or strobe, handling the switching of the switch by a control logic component, and swapping in the adjusted programmable clock or strobe by the switch to service a downstream clocktree or strobe path after the programmable clock or strobe is adjusted.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

In order for the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and is therefore not to be considered limiting of its scope. The invention may admit to other equally effective embodiments.

These and other features, benefits, and advantages of the present invention will become apparent by reference to the following figures, with like reference numbers referring to like structures across the views, wherein.

DETAILED DESCRIPTION OF THE INVENTION

Figure 1:
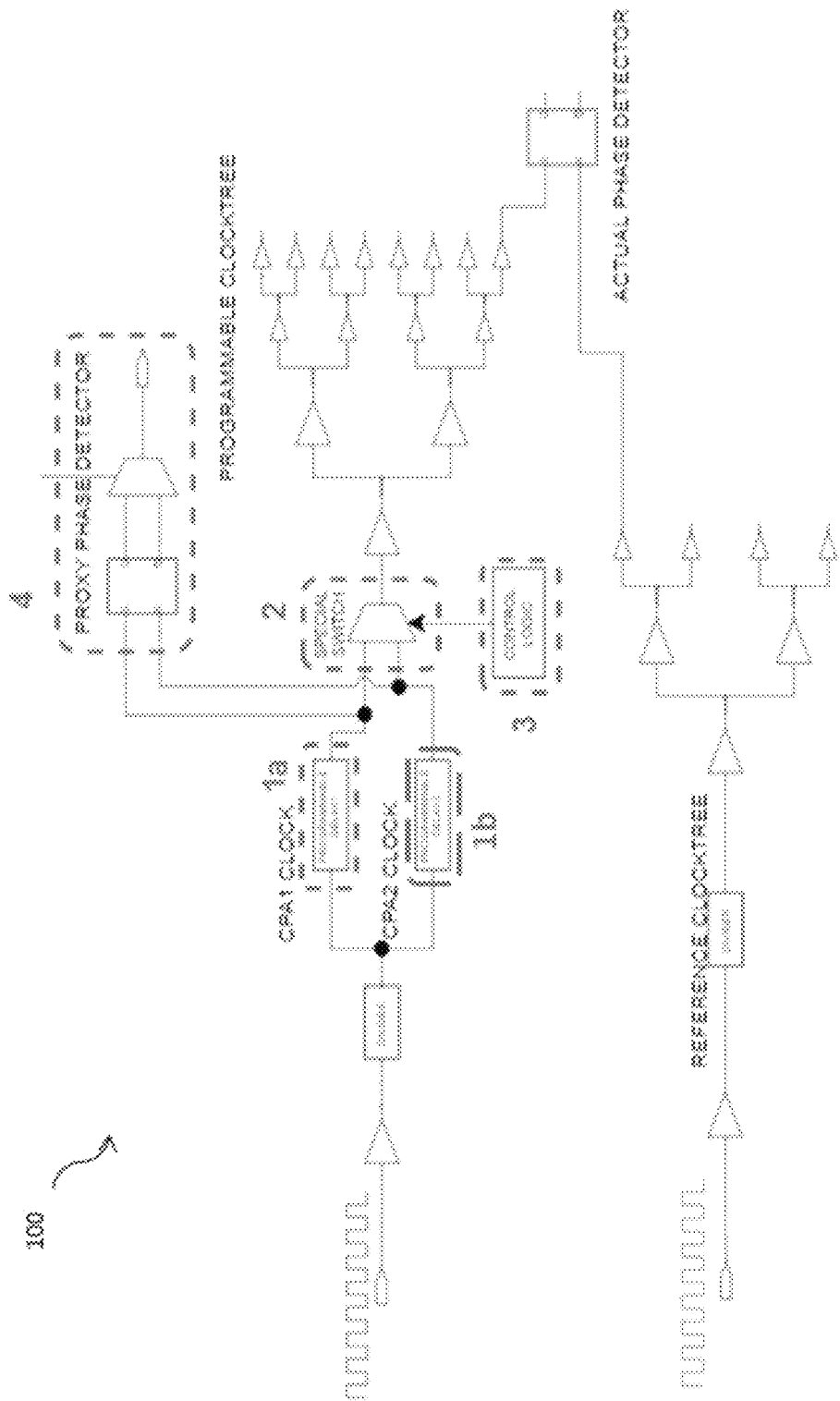
FIG. 1 is a block diagram illustrating a system for aligning a programmable clock in accordance with an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art.

Referring to the drawings as shown in FIGS. 1 to 15, the present invention will now be described in more detail.

The present invention relates to a system (100) for aligning a programmable clock. FIG. 1 is a block diagram illustrating a system (100) for aligning a programmable clock in accordance with an embodiment of the present invention. The system (100) comprises a first programmable delay unit (1a) for receiving the programmable clock, characterized by a second programmable delay unit (1b) connected in parallel to the first programmable delay unit (1a) for receiving the programmable clock, a switch (2) for switching one of the two programmable delay units (1a or 1b) to service the programmable clock so as to allow the other programmable delay unit (1a or 1b) to adjust the other programmable clock, and a control logic component (3) for handling the switching of the switch (2), in which the switch (2) swaps in the adjusted programmable clock to service a downstream clocktree after the programmable clock is adjusted. Further, the system (100) comprises an actual phase detector for comparing phase of the programmable clock with phase of a reference clock. Further, the system (100) comprises a proxy phase detector (4) for comparing phase of the programmable clock being serviced with phase of the programmable clock being adjusted.

Figure 2:
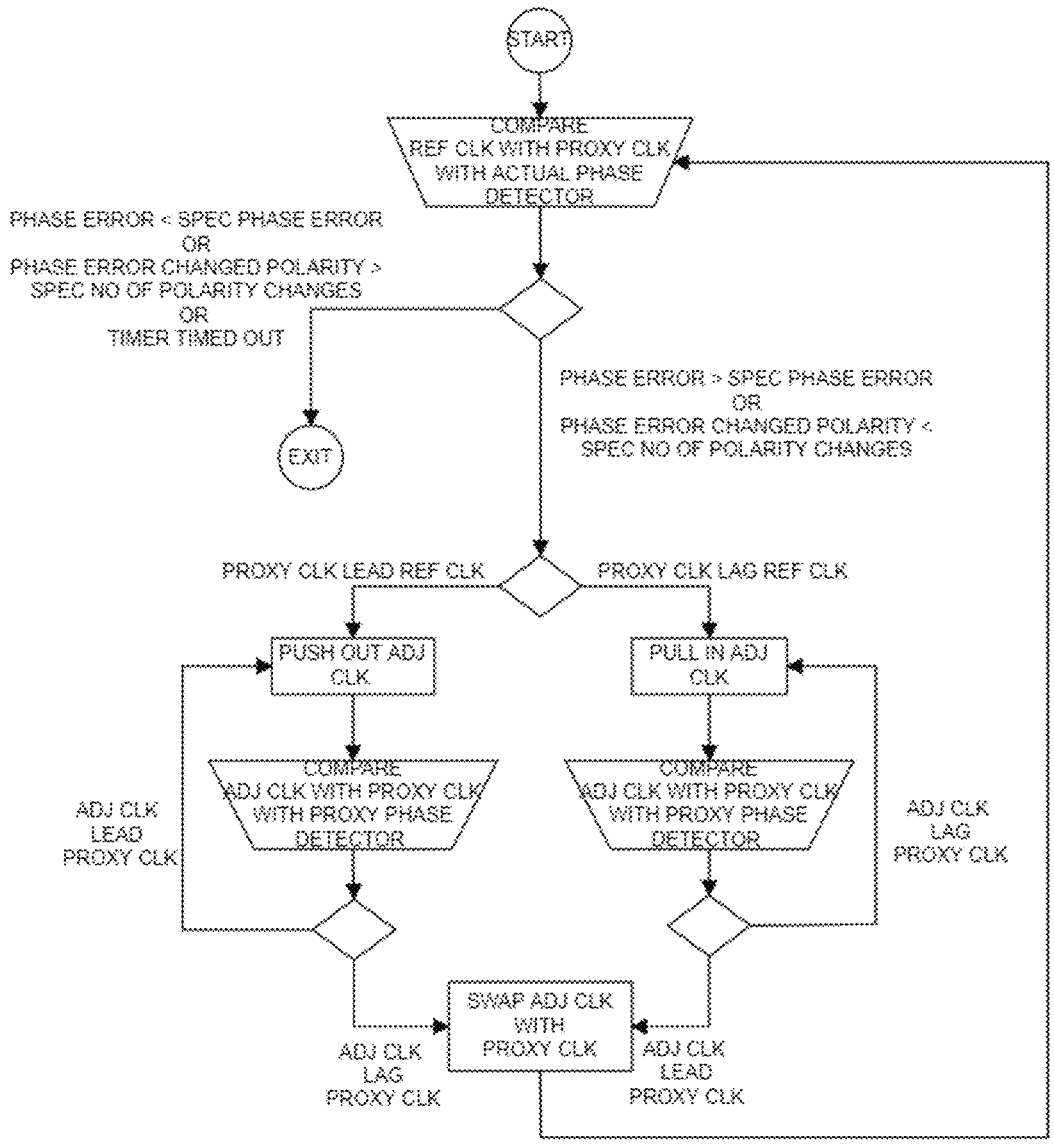
FIG. 2 is a flowchart illustrating a process of aligning a programmable clock in accordance with an embodiment of the present invention.

FIG. 2 is a flowchart illustrating a process of aligning a programmable clock in accordance with an embodiment of the present invention. Firstly, the actual phase detector compares the phase of the programmable or proxy clock with the phase of the reference clock to decide whether the phase of the programmable or proxy clock needs to be adjusted. When the phase of the programmable or proxy clock needs to be adjusted, one of the two programmable delay units (1*a* or 1*b*) can be selected by the switch (2) to service the programmable or proxy clock and remain undisturbed. In the meantime, the other programmable delay unit (1*a* or 1*b*) can proceed to adjust the programmable or proxy clock without fear of causing any glitches to the output of the programmable or proxy clock as the programmable or proxy clock being adjusted is masked by the switch (2). The first programmable delay unit (1*a*) can be a duplicate of the second programmable delay unit (1*b*). When it is found that the programmable or proxy clock is leading the reference clock by the actual phase detector, the programmable or proxy clock being adjusted will be pushed out by one of the programmable delay units (1*a* or 1*b*). When it is found that the programmable clock is lagging behind the reference clock by the actual phase detector, the programmable or proxy clock being adjusted will be pulled in by one of the programmable delay unit (1*a* or 1*b*). The proxy phase detector (4) can be employed to compare the phase of the programmable or proxy clock being serviced with the phase of the programmable or proxy clock being adjusted to determine whether the phase adjustment should continue or stop. Once the adjustment is completed, the switch (2) will swap in the adjusted programmable or proxy clock. The control logic component (3) can be used to facilitate the swapping procedure. The whole process can be repeated until the phase difference between the programmable or proxy clock and the reference clock is negligible or a state machine determines that there is no further benefit in continuing the clock phase adjustment or a timer has timed out.

Figure 3:
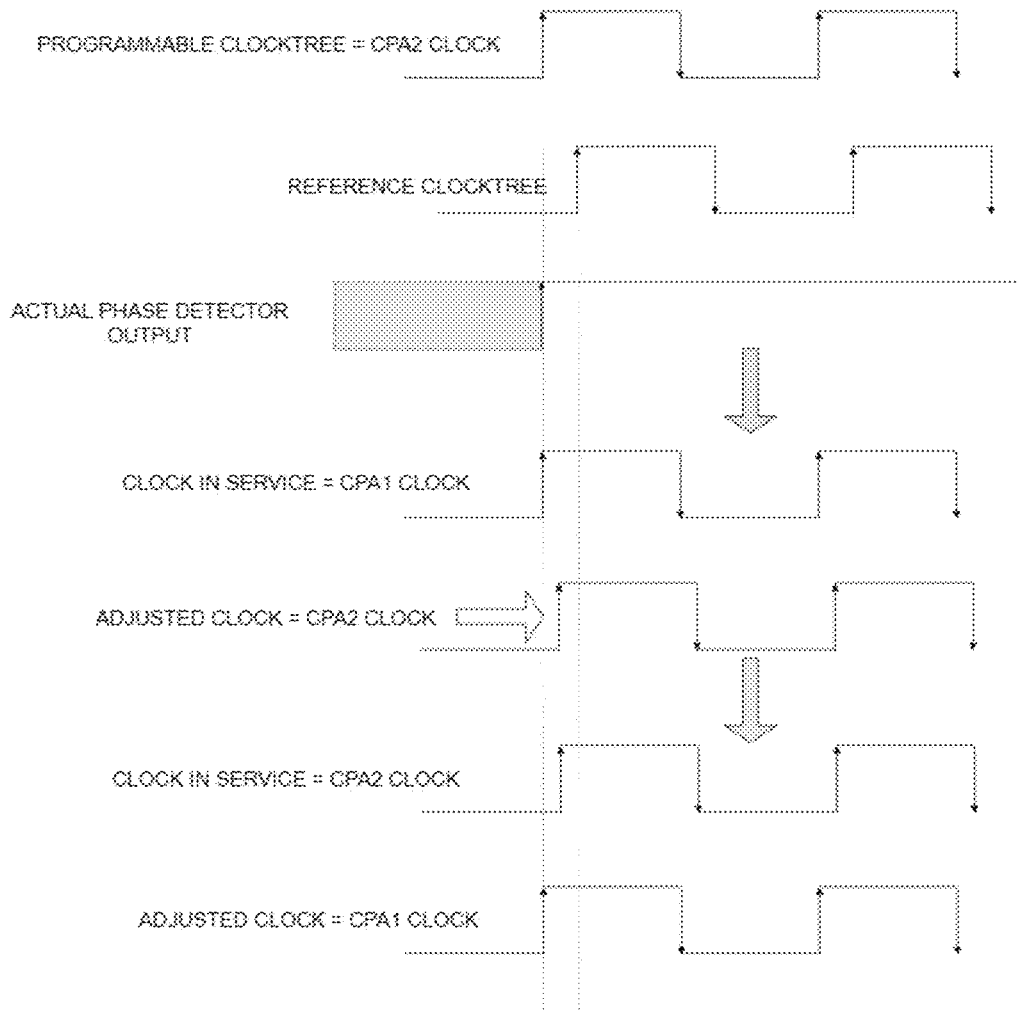
FIG. 3 is a waveform diagram demonstrating how to push out a programmable clock in accordance with an embodiment of the present invention.

FIG. 3 is a waveform diagram demonstrating how to push out a programmable clock in accordance with an embodiment of the present invention. In this embodiment, the first programmable clock from the first programmable delay unit (1*a*), denoted as CPA1 clock, is servicing the downstream clocktree while the second programmable clock from the second programmable delay unit (1*b*), denoted as CPA2 clock, is being adjusted. The actual phase detector indicates that the downstream clocktree, which is being serviced by CPA1 clock, is leading the reference clocktree, and thus the phase of the programmable clock has to be pushed out. Therefore, CPA2 clock is pushed out until it lags behind CPA1. After the adjustment is completed, CPA2 clock can be swapped to service the downstream clocktree. The proxy phase detector (4) can be employed to determine the relative position between CPA1 clock and CPA2 clock. Further, it is readily understood that the aforesaid procedure is equally applicable when CPA2 clock is servicing the downstream clocktree while CPA1 clock is being adjusted.

Figure 4:
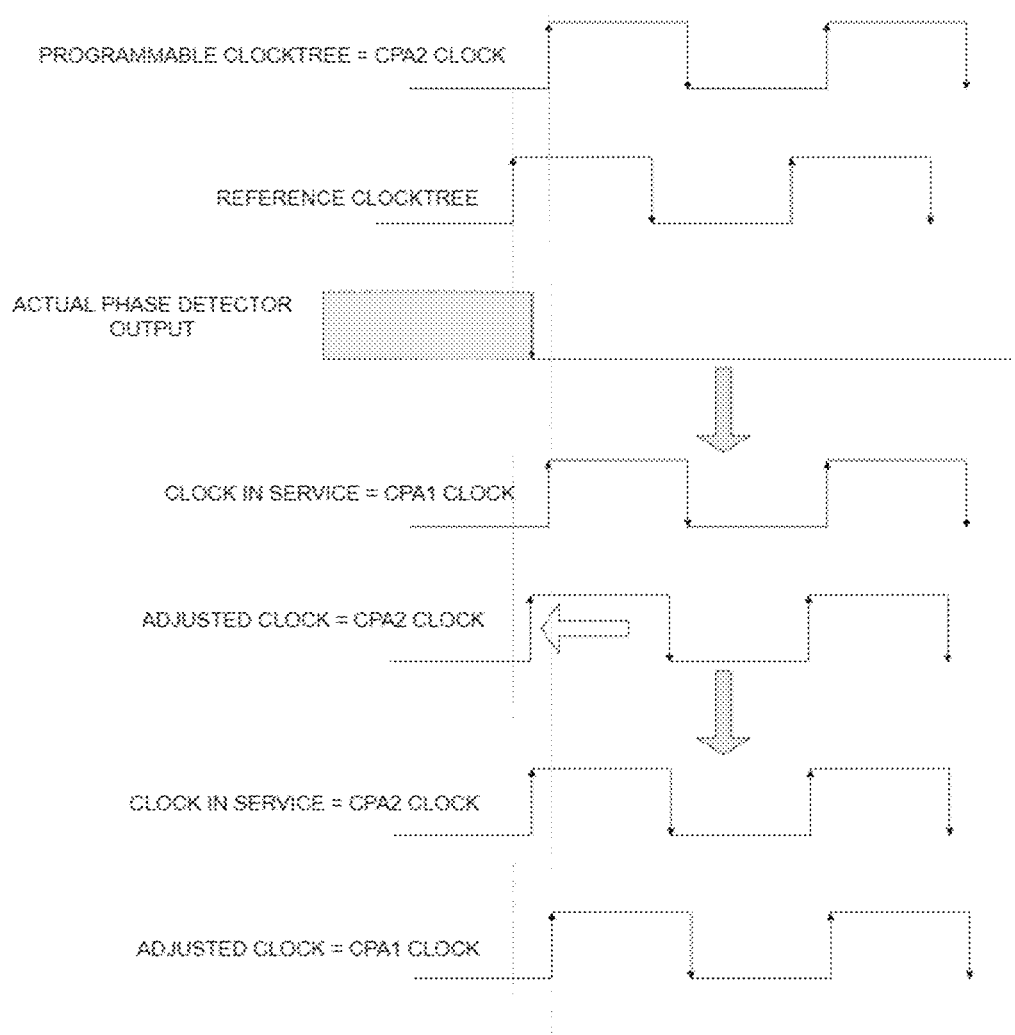
FIG. 4 is a waveform diagram demonstrating how to pull in a programmable clock in accordance with an embodiment of the present invention.

FIG. 4 is a waveform diagram demonstrating how to pull in a programmable clock in accordance with an embodiment of the present invention. In this embodiment, the first programmable clock from the first programmable delay unit (1*a*), denoted as CPA1 clock, is servicing the downstream clocktree while the second programmable clock from the second programmable delay unit (1*b*), denoted as CPA2 clock, is being adjusted. The actual phase detector indicates that the downstream clocktree, which is being serviced by CPA1 clock, is lagging behind the reference clocktree, and thus the phase of the programmable clock has to be pulled in. Therefore, the programmable clock CPA2 clock is pulled in until it leads the programmable clock CPA1. After the adjustment is completed, CPA2 clock can be swapped to service the downstream clocktree.

Figure 5:
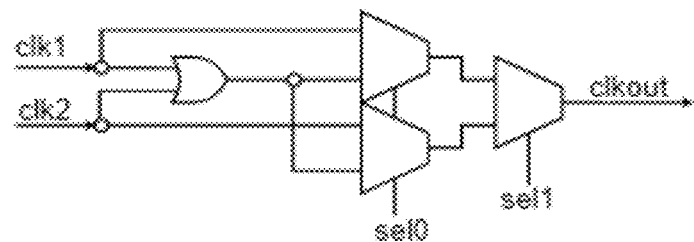
FIG. 5 is a block diagram illustrating an OR gate-based switch in accordance with an embodiment of the present invention.
Figure 6:
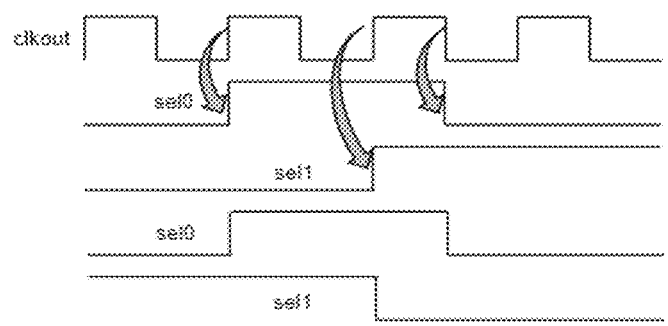
FIG. 6 illustrates a control sequence for controlling the multiplexors of FIG. 5.
Figure 7:
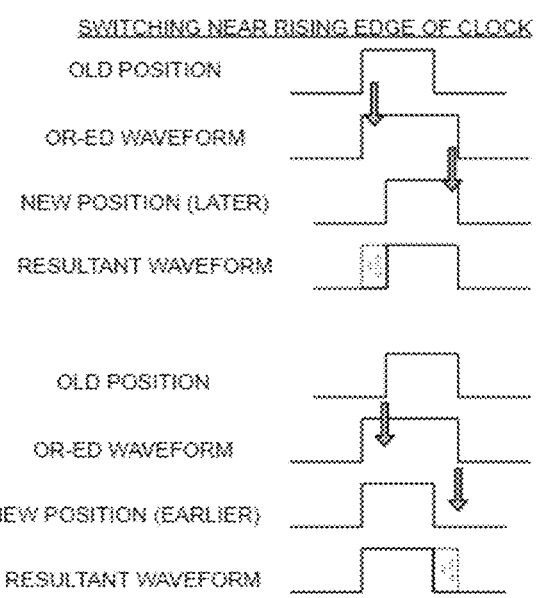
FIG. 7 is a waveform diagram demonstrating how to swap in the adjusted programmable clock with the aid of the OR gate and the multiplexors in accordance with an embodiment of the present invention.
Figure 8:
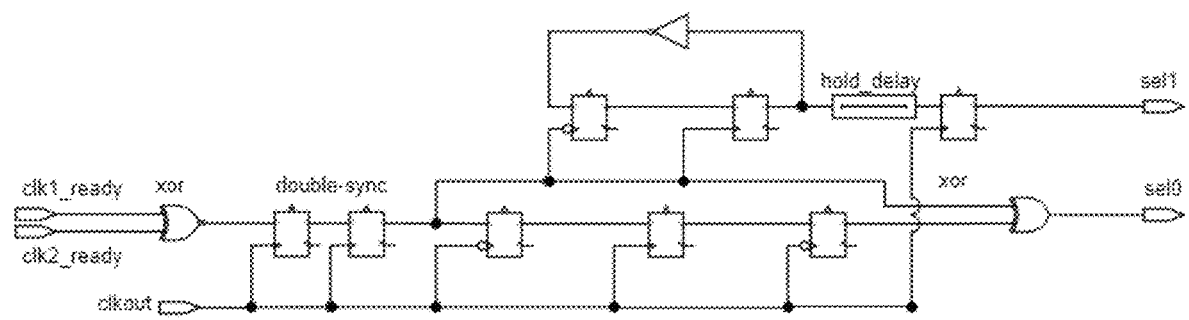
FIG. 8 is a block diagram illustrating an example control logic component for producing the control sequence of FIG. 5.

In accordance with an embodiment of the present invention, the switch (2) comprises an OR gate and a plurality of multiplexors, in which the multiplexors are controlled by the control logic component (3) through a control sequence. FIG. 5 is a block diagram illustrating an example of the OR gate-based switch. The multiplexors can be divided into two sets. The first set comprising two multiplexors can be controlled by a first control signal denoted as sel0 while the final set comprising one multiplexor can be controlled by a second signal denoted as sel1. The OR gate can be used to produce an intermediate clock which eliminates any glitches when the multiplexors are switched near the rising edges of the first or second programmable clock. FIG. 6 illustrates a control sequence for controlling the multiplexors of FIG. 5. Firstly, the switch (2) can switch to the intermediate OR-ed clock by asserting sel0 control signal just after the rising edge of the programmable clock. Once it is transitioned to the intermediate OR-ed clock, the switch (2) can switch to the adjusted programmable clock by toggling sel1 control signal just after the rising edge of the programmable clock. After that, sel0 control signal can be deasserted just after the falling edge of the programmable clock. FIG. 7 is a waveform diagram demonstrating how to swap in the adjusted programmable clock with the aid of the OR gate and the multiplexors. FIG. 8 is a block diagram illustrating an example control logic component (3) for producing the control sequence of FIG. 5. It is readily understood that the control logic component (3) is also applicable to other forms that are expected by a person skilled in the art to achieve the same control sequence.

Figure 9:
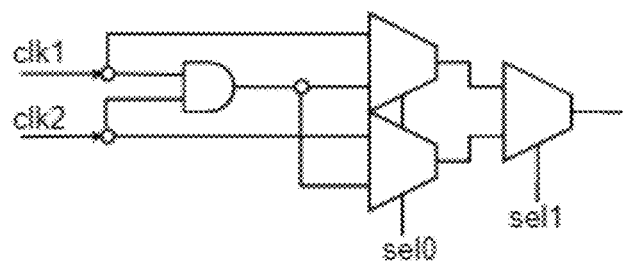
FIG. 9 is a block diagram illustrating an AND gate-based switch in accordance with an embodiment of the present invention.
Figure 10:
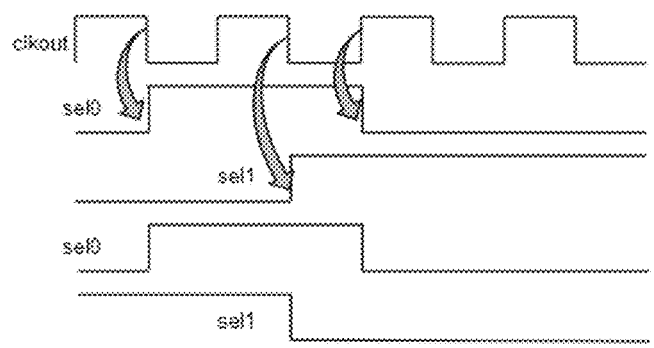
FIG. 10 illustrates a control sequence for controlling the multiplexors of FIG. 9.
Figure 11:
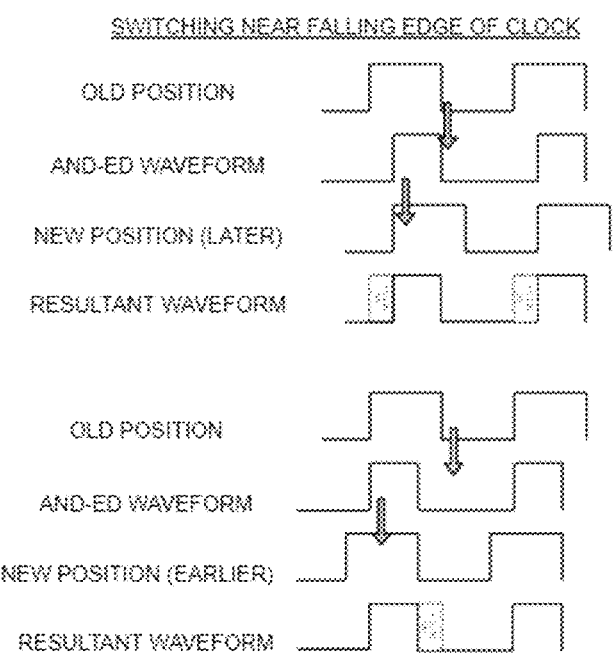
FIG. 11 is a waveform diagram demonstrating how to swap in the adjusted programmable clock with the aid of the AND gate and the multiplexors in accordance with an embodiment of the present invention.

In accordance with an embodiment of the present invention, the switch (2) comprises an AND gate and a plurality of multiplexors, in which the multiplexors are controlled by the control logic component (3) through a control sequence. FIG. 9 is a block diagram illustrating an example of the AND gate-based switch. The multiplexors can be divided into two sets. The first set comprising two multiplexors can be controlled by a first control signal denoted as sel0 while the final set comprising one multiplexor can be controlled by a second signal denoted as sel1. The AND gate can be used to produce an intermediate clock which eliminates any glitches when the multiplexors are switched near the falling edges of the first or second programmable clock. FIG. 10 illustrates a control sequence for controlling the multiplexors of FIG. 9. Firstly, the switch (2) can switch to the intermediate AND-ed clock by asserting sel0 control signal just after the falling edge of the programmable clock. Once it is transitioned to the intermediate AND-ed clock, the switch (2) can switch to the adjusted programmable clock by toggling sel1 control signal just after the falling edge of the programmable clock. After that, sel0 control signal can be deasserted just after the rising edge of the programmable clock. FIG. 11 is a waveform diagram demonstrating how to swap in the adjusted programmable clock with the aid of the AND gate and the multiplexors.

Figure 12:
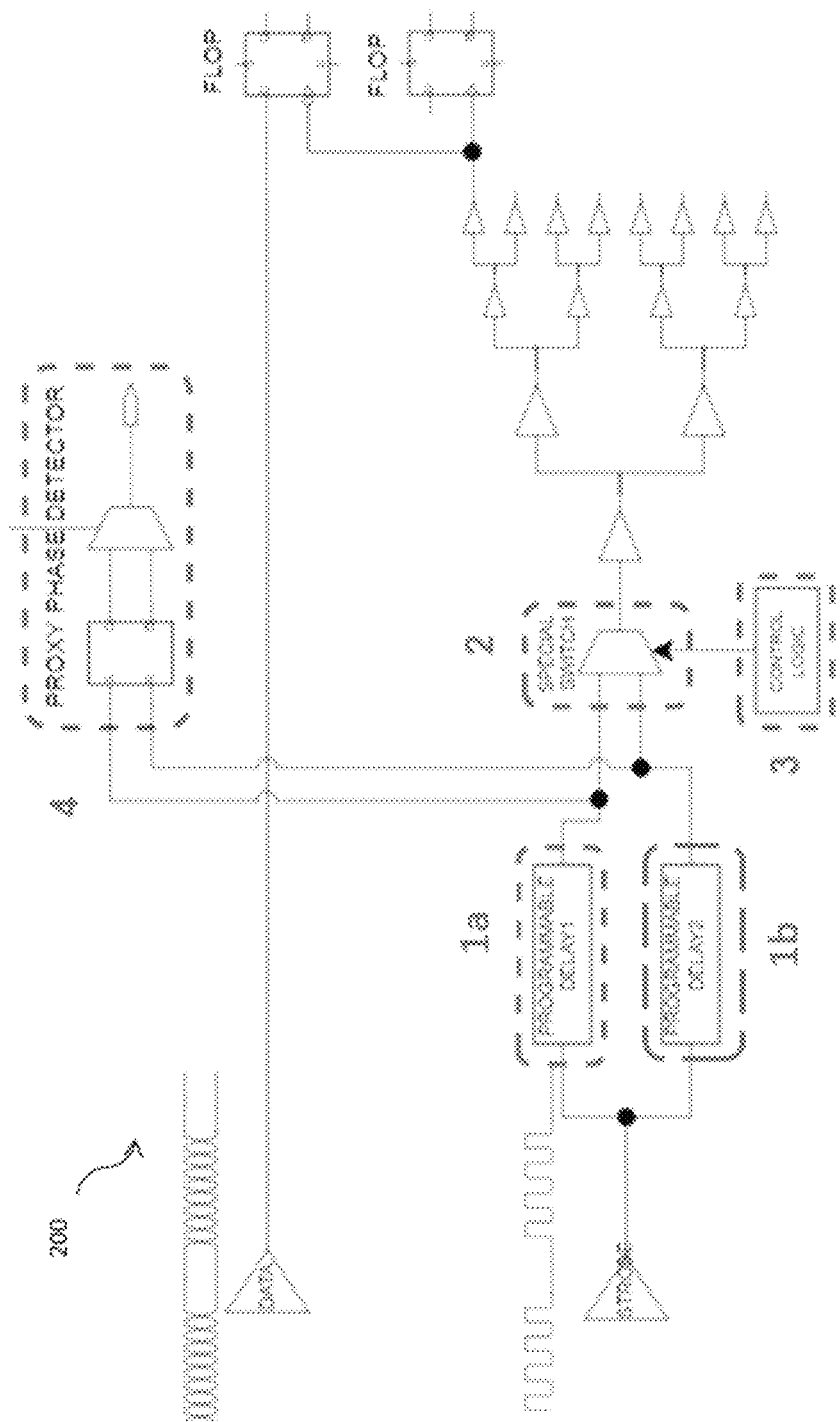
FIG. 12 is a block diagram illustrating a system for aligning a programmable strobe in accordance with an embodiment of the present invention.

The present invention also relates to a system (200) for aligning a programmable strobe. FIG. 12 is a block diagram illustrating a system (200) for aligning a programmable strobe in accordance with an embodiment of the present invention. The system (200) comprises a first programmable delay unit (1a) for receiving the programmable strobe, characterized by a second programmable delay unit (1b) connected in parallel to the first programmable delay unit (1a) for receiving the programmable strobe, a switch (2) for switching one of the two programmable delay units (1a or 1b) to service the programmable strobe so as to allow the other programmable delay unit (1a or 1b) to adjust the other programmable strobe, and a control logic component (3) for handling the switching of the switch (2), in which the switch (2) swaps in the adjusted programmable strobe to service a downstream strobe path after the programmable strobe is adjusted.

Figure 13:
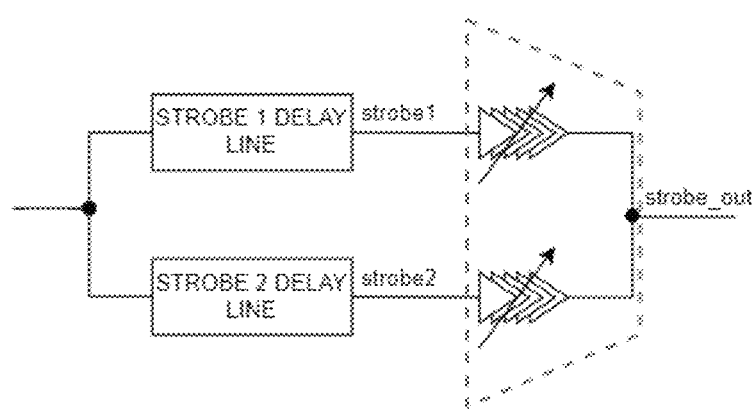
FIG. 13 is a block diagram illustrating an interpolator-based switch in accordance with an embodiment of the present invention.

In accordance with an embodiment of the present invention, the switch (2) comprises an interpolator-based switch. FIG. 13 is a block diagram illustrating an example of the interpolator-based switch. The interpolator-based switch can be an existing multiplexor with the CMOS pass gates replaced by the interpolators. The interpolators allow the programmable strobe to be updated or adjusted at any time by gradually reducing the strength of one programmable strobe, denoted as strobe1, from one of the two programmable delay units (1a or 1b) and increasing the strength of another programmable strobe, denoted as strobe2, from the other programmable delay unit (1a or 1b), thereby achieving gradual swapping without causing any glitches.

Figure 14A:
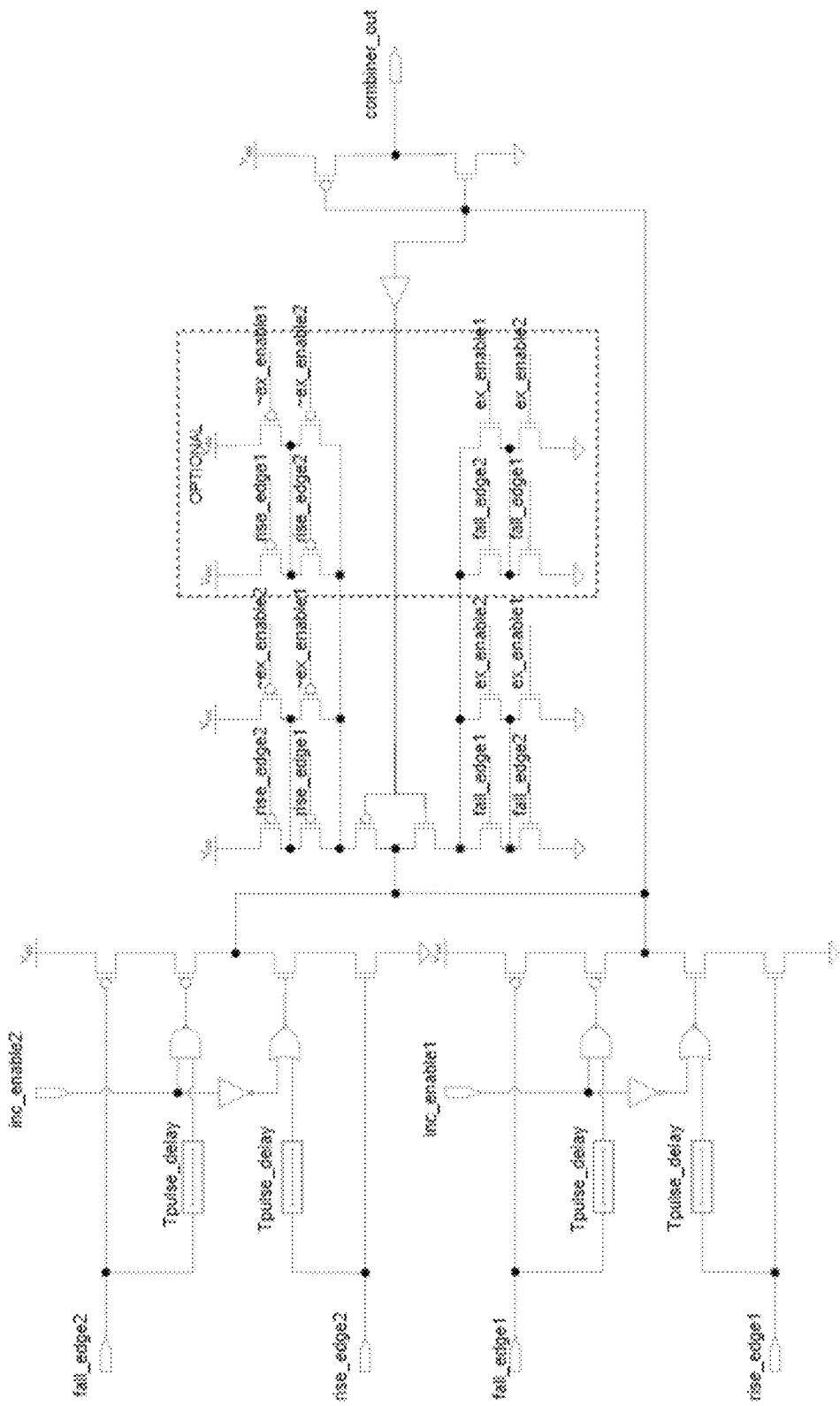
FIGS. 14a and 14b are block diagrams illustrating combiner-based switches in accordance with an embodiment of the present invention.
Figure 14B:
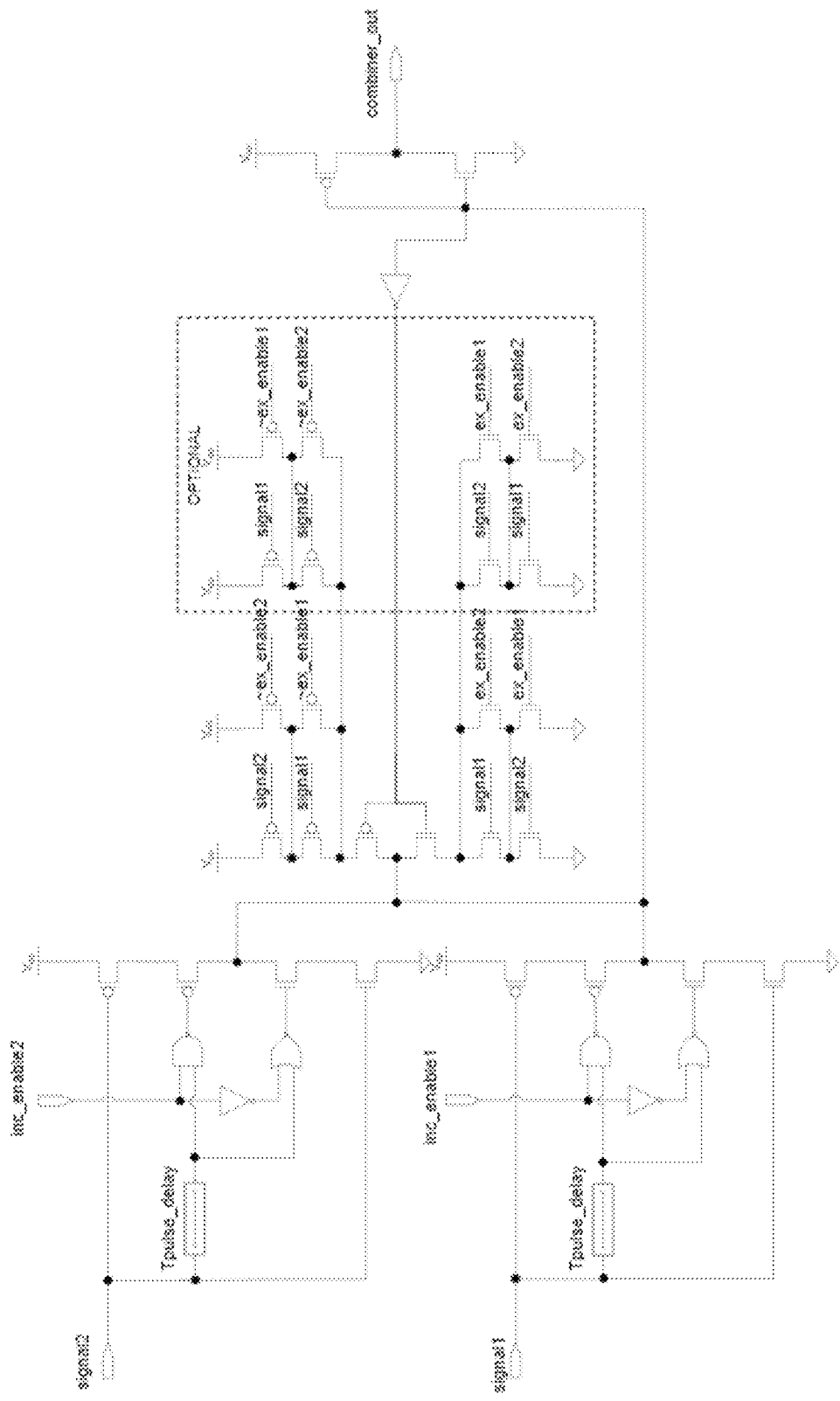
Figure 15:
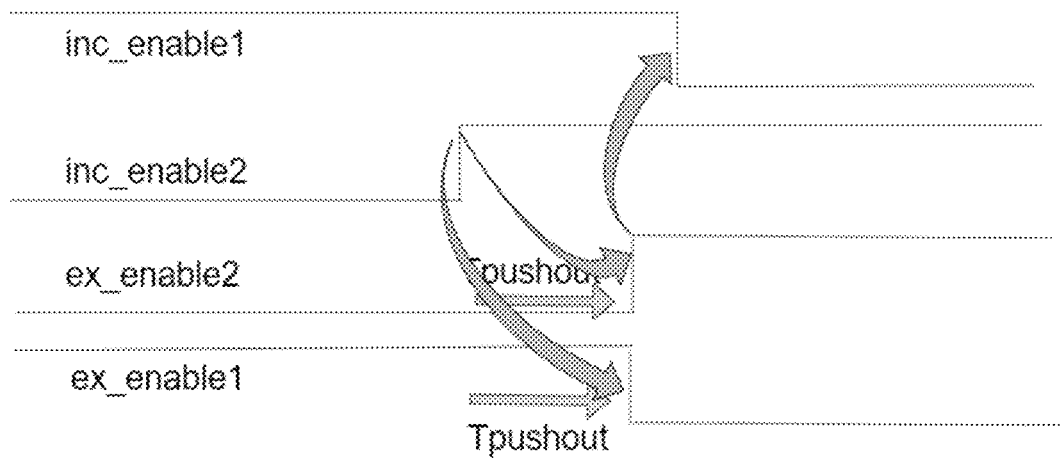
FIG. 15 illustrates a control sequence for controlling the combiner-based switches of FIGS. 14a and 14b.

In accordance with an embodiment of the present invention, the switch (2) comprises a combiner-based switch. FIG. 14a is a block diagram illustrating an example of the combiner-based switch. The combiner-based switch can be a modified combiner with additional pulsed pullup and pulldown circuits. Further, the keeper circuit of the modified combiner can be triply stacked to avoid signal contention and degradation in latency. Further, fall_edge1 and rise_edge1 pins can be assigned to one of the two programmable strobes while fall_edge2 and rise_edge2 pins can be assigned to the other programmable strobe. Accordingly, there are separate enable controls for the pulsed circuits and the keeper circuits respectively. For the pulsed circuits, the enables are inclusive, which means that it is possible to enable both pulsed circuits for both of the programmable strobes. Accordingly, the names inc_enable1 and inc_enable2 are given in FIG. 14a. On the other hand, for the keeper circuits, the enables are mutually exclusive and thus the names ex_enable1 and ex_enable2 are given in FIG. 14a. The enables are mutually exclusive such that if ex_enable1 control signal is asserted, ex_enable2 control signal must be deasserted at the same time. FIG. 15 illustrates a control sequence for controlling the combiner-based switches of FIGS. 14a and 14b. In these embodiments, when it is desired to switch from one programmable strobe, such as strobe1, to the other programmable strobe, such as strobe2, it is required to ensure that inc_enable2 control signal is asserted earlier before the deassertion of inc_enable1 control signal, that is, there is an overlap period of the assertion of inc_enable1 and inc_enable2 control signals during the switching. In that sense, they are deemed as "inclusive" enable control signals as it is desired both enable controls to overlap. Upon a timing lapse of Tpushout being greater than Tpulse_delay, ex_enable1 control signal can be deasserted and ex_enable2 control signal can be asserted. Contrary to the "inclusive" enable control signals, ex_enable1 and ex_enable2 control signals are deemed as "exclusive" enable control signals because it is desired only one of the control signals to be asserted, that is, no overlap. Subsequently, inc_enable1 can be deasserted to complete the handover from strobe1 to strobe2. Accordingly, the combiner-based switch can achieve switching that can occur anytime and even when there is no incoming strobe because the switching is not initiated by any strobe edge. FIG. 14b is a block diagram illustrating another example of the combiner-based switch. The combiner-based switch of FIG. 14b can be a variant of the combiner-based of FIG. 14a. In this embodiment, there are no rise and fall edges, and pulse delay blocks are merged. For example, fall_edge1 and rise_edge1 pins are shorted together while fall_edge2 and rise_edge2 pins are shorted together as well in this embodiment.

The present invention also relates to a method for aligning a programmable clock or strobe. The method comprises the steps of receiving the programmable clock or strobe by a first programmable delay unit (1a), receiving the programmable clock or strobe by a second programmable delay unit (1b) connected in parallel to the first programmable delay unit (1a), switching one of the two programmable delay units (1a or 1b) by a switch (2) to service the programmable clock or strobe so as to allow the other programmable delay unit (1a or 1b) to adjust the other programmable clock or strobe, handling the switching of the switch (2) by a control logic component (3), and swapping in the adjusted programmable clock or strobe by the switch (2) to service a downstream clocktree or strobe path after the programmable clock or strobe is adjusted.

In accordance with an embodiment of the present invention, the step of swapping in the adjusted programmable clock comprises the steps of forming an intermediate clock between the programmable clock and the adjusted programmable clock by an OR gate, and asserting and deasserting a plurality of control signals according to a control sequence for controlling a plurality of multiplexors to output the adjusted programmable clock based on the intermediate clock.

In accordance with an embodiment of the present invention, the step of swapping in the adjusted programmable clock comprises the steps of forming an intermediate clock between the programmable clock and the adjusted programmable clock by an AND gate, and asserting and deasserting a plurality of control signals according to a control sequence for controlling a plurality of multiplexors to output the adjusted programmable clock based on the intermediate clock.

In accordance with an embodiment of the present invention, the step of swapping in the adjusted programmable strobe comprises the step of asserting and deasserting a plurality of control signals according to a control sequence for controlling a combiner to output the adjusted programmable strobe.

Accordingly, the system (100) and the method of the present invention are capable of aligning the phase of a clocktree with the phase of a reference clocktree without causing clock output glitches. Moreover, the system (200) and the method of the present invention are capable of updating a programmable delay line for non-continuous strobe signals without causing output strobe glitches. Additionally, the system (200) and the method of the present invention are capable of facilitating the strobe swapping or delay update at any time without requiring the presence of a toggling clock or strobe.

The exemplary implementation described above is illustrated with specific characteristics, but the scope of the invention includes various other characteristics.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

It is to be understood that any prior art publication referred to herein does not constitute an admission that the publication forms part of the common general knowledge in the art.

In the claim which follows and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

The invention claimed is:

1. A system (100 or 200) for aligning a programmable clock or strobe, comprising:
    a first programmable delay unit (1a) for receiving the programmable clock or strobe;
    characterized by
    a second programmable delay unit (1b) connected in parallel to the first programmable delay unit (1a) for receiving the programmable clock or strobe;
    a switch (2) for switching one of the two programmable delay units (1a or 1b) to service the programmable clock or strobe so as to allow the other programmable delay unit (1a or 1b) to adjust another programmable clock or strobe; and
    a control logic component (3) for handling the switching of the switch (2);
    wherein the switch (2) swaps in the adjusted programmable clock or strobe to service a downstream clocktree or strobe path after the programmable clock or strobe is adjusted,
    wherein the switch:
    forming an intermediate clock between the programmable clock and the adjusted programmable clock by an OR gate or an AND gate; and
    asserting and deasserting a plurality of control signals according to a control sequence for controlling a plurality of multiplexors to output the adjusted programmable clock based on the intermediate clock.

2. The system (100) as claimed in claim 1, further comprising an actual phase detector for comparing phase of the programmable clock with phase of a reference clock.

3. The system (100) as claimed in claim 1, further comprising a proxy phase detector (4) for comparing phase of the programmable clock being serviced with phase of the programmable clock being adjusted.

4. The system (100) as claimed in claim 1, wherein the switch (2) comprises:
    an OR gate; and
    a plurality of multiplexors;
    wherein the multiplexors are controlled by the control logic component (3) through a control sequence.

5. The system (100) as claimed in claim 1, wherein the switch (2) comprises:
    an AND gate; and
    a plurality of multiplexors;
    wherein the multiplexors are controlled by the control logic component (3) through a control sequence.

6. The system (200) as claimed in claim 1, wherein the switch (2) comprises an interpolator-based switch.

7. The system (200) as claimed in claim 1, wherein the switch (2) comprises a combiner-based switch comprising additional pulsed pullup and pulldown circuits and triply-stacked keeper circuit.

8. The system (200) as claimed in claim 7, wherein pulse delay blocks of the combiner-based switch are merged.

9. A method for aligning a programmable clock or strobe, characterized by the steps of:
    receiving the programmable clock or strobe by a first programmable delay unit (1a);
    receiving the programmable clock or strobe by a second programmable delay unit (1b) connected in parallel to the first programmable delay unit (1a);
    switching one of the two programmable delay units (1a or 1b) by a switch (2) to service the programmable clock or strobe so as to allow the other programmable delay unit (1a or 1b) to adjust another programmable clock or strobe;
    handling the switching of the switch (2) by a control logic component (3); and
    swapping in the adjusted programmable clock or strobe by the switch (2) to service a downstream clocktree or strobe path after the programmable clock or strobe is adjusted,
    wherein the step of swapping in the adjusted programmable clock comprises the steps of:
    forming an intermediate clock between the programmable clock and the adjusted programmable clock by an OR gate or an AND gate; and
    asserting and deasserting a plurality of control signals according to a control sequence for controlling a plurality of multiplexors to output the adjusted programmable clock based on the intermediate clock.

10. The method as claimed in claim 9, wherein the step of swapping in the adjusted programmable strobe comprises the step of asserting and deasserting a plurality of control signals according to a control sequence for controlling a combiner to output the adjusted programmable strobe.

* * * * *